United States Patent
Niu et al.

(10) Patent No.: US 12,028,809 B2
(45) Date of Patent: Jul. 2, 2024

(54) SIGNALING CHARACTERISTIC EVALUATION RELAXATION FOR USER EQUIPMENT POWER SAVING

(71) Applicant: Apple Inc., Cupertino, CA (US)

(72) Inventors: Huaning Niu, San Jose, CA (US); Yushu Zhang, Beijing (CN); Yang Tang, San Jose, CA (US); Jie Cui, San Jose, CA (US); Manasa Raghavan, Sunnyvale, CA (US); Dawei Zhang, Saratoga, CA (US); Wei Zeng, Saratoga, CA (US); Haitong Sun, Cupertino, CA (US); Hong He, San Jose, CA (US); Chunhai Yao, Beijing (CN); Sigen Ye, Whitehouse Station, NJ (US); Weidong Yang, San Diego, CA (US); Oghenekome Oteri, San Diego, CA (US); Chunxuan Ye, San Diego, CA (US)

(73) Assignee: Apple Inc., Cupertino, CA (US)

( * ) Notice: Subject to any disclaimer, the term of this patent is extended or adjusted under 35 U.S.C. 154(b) by 350 days.

(21) Appl. No.: 17/440,551

(22) PCT Filed: Oct. 8, 2020

(86) PCT No.: PCT/CN2020/119869
§ 371 (c)(1),
(2) Date: Sep. 17, 2021

(87) PCT Pub. No.: WO2022/073164
PCT Pub. Date: Apr. 14, 2022

(65) Prior Publication Data
US 2022/0322234 A1 Oct. 6, 2022

(51) Int. Cl.
*H04W 52/02* (2009.01)
*H04B 7/06* (2006.01)
*H04W 24/10* (2009.01)

(52) U.S. Cl.
CPC ...... *H04W 52/0232* (2013.01); *H04B 7/0695* (2013.01); *H04W 24/10* (2013.01); *H04W 52/0274* (2013.01)

(58) Field of Classification Search
CPC ............ H04W 52/0232; H04W 24/10; H04W 52/0274; H04B 7/0695
(Continued)

(56) References Cited

U.S. PATENT DOCUMENTS

2012/0281563 A1* 11/2012 Comsa .................. H04W 24/10
370/252
2016/0081020 A1* 3/2016 Rahman ................ H04W 24/10
370/311
(Continued)

FOREIGN PATENT DOCUMENTS

CN 110519787 A 11/2019
CN 111316577 A 6/2020
(Continued)

OTHER PUBLICATIONS

CSI-RS Measurement Outside C-DRX Active Time, R4-1912554, 3GPP TSG-RAN WG4 Meeting #92bis, Oct. 14-18, 2019, 3 pages.
(Continued)

*Primary Examiner* — Mark G. Pannell
(74) *Attorney, Agent, or Firm* — Kilpatrick Townsend & Stockton LLP

(57) ABSTRACT

The present application relates to devices and components including apparatus, systems, and methods for relaxing signaling characteristic evaluation measurements in wireless communication systems.

20 Claims, 8 Drawing Sheets

(58) Field of Classification Search
USPC .......................................................... 370/318
See application file for complete search history.

(56) References Cited

U.S. PATENT DOCUMENTS

| | | | |
|---|---|---|---|
| 2019/0349797 A1* | 11/2019 | Lin | H04W 24/10 |
| 2020/0337110 A1* | 10/2020 | Kim | H04W 76/28 |
| 2021/0051507 A1* | 2/2021 | Lin | H04W 56/0055 |
| 2021/0321420 A1* | 10/2021 | Islam | H04L 5/0032 |
| 2021/0377829 A1* | 12/2021 | Wang | H04W 36/0094 |
| 2022/0015132 A1* | 1/2022 | Sharma | H04W 72/1263 |
| 2022/0104044 A1* | 3/2022 | Huang | H04W 24/08 |
| 2022/0217565 A1* | 7/2022 | Thangarasa | H04W 76/28 |
| 2023/0063137 A1* | 3/2023 | Matsumura | H04B 7/088 |
| 2023/0180079 A1* | 6/2023 | Hwang | H04W 36/0088 |
| | | | 455/436 |
| 2023/0284145 A1* | 9/2023 | Da Silva | H04W 52/0235 |
| | | | 370/311 |

FOREIGN PATENT DOCUMENTS

| | | |
|---|---|---|
| WO | 2020089513 | 5/2020 |
| WO | 2020164720 A1 | 8/2020 |
| WO | 2021064281 A1 | 4/2021 |
| WO | 2021064283 A1 | 4/2021 |

OTHER PUBLICATIONS

European Patent Application No. 20956479.8, Extended European Search Report, dated Sep. 18, 2023, 9 pages.

International Patent Application No. PCT/CN2020/119869, International Preliminary Report on Patentability, dated Apr. 20, 2023, 6 pages.

Email Discussion Summary for [99-e][231] NR_UE_pow_sav_enh_RRM, Moderator (MediaTek inc.), 3GPP TSG-RAN WG4 Meeting # 99-e; R4-2108403, May 27, 2021, 66 pages.

International Patent Application No. PCT/CN2021/120222, International Search Report and Written Opinion, May 27, 2022, 9 pages.

International Patent Application No. PCT/CN2021/097257, International Search Report and Written Opinion, May 31, 2022, 7 pages.

Complexity reduction for Reduced Capability NR devices, Vivo, Guangdong Genius, 3GPP TSG-RAN WG1 Meeting #103-e; R1-2007668, Oct. 26-Nov. 13, 2020, 62 pages.

Discussion on potential UE complexity reduction features, Spreadtrum Communications, 3GPP TSG-RAN WG1 Meeting #103-e; R1-2008100, Oct. 26-Nov. 13, 2020, 11 pages.

Discussion on RLM/BFD Relaxation, Vivo, 3GPP TSG RAN WG1 #102, R1-2005392, Aug. 2020, 4 pages.

On OOS and IS Indication Interval for NR RLM, Intel Corporation, 3GPP TSG-RAN4 Meeting #85, R4-1712362, Nov. 2017, 4 pages.

RLM Requirement for IAB-MT, Samsung, 3GPP TSG-RAN WG4 Meeting #95e, R4-2006433, May 2020, 5 pages.

RRM Requirements on Inter-Frequency Measurement Without Gap, CMCC, 3GPP TSG-RAN WG4 Meeting #94-e, R4-2000644, Feb. 2020.

International Patent Application No. PCT/CN2020/119869, International Search Report and Written Opinion, dated Jul. 2, 2021, 9 pages.

Revised WID UE Power Saving Enhancements for NR, Media Tek Inc., 3GPP TSG RAN Meeting #88e, RP-200938, Jun. 29-Jul. 3, 2020, 5 pages.

3rd Generation Partnership Project; Technical Specification Group Radio Access Network; NR; Requirements for support of radio resource management (Release 16), 3GPP TS 38.133 V16.4.0, Jun. 2020, 1463 pages.

3rd Generation Partnership Project; Technical Specification Group Radio Access Network; NR; NR and NG-RAN Overall Description; Stage 2 (Release 16), 3GPP TS 38.300 V16.3.0, Sep. 2020, 148 pages.

3rd Generation Partnership Project; Technical Specification Group Radio Access Network; NR; User Equipment (UE) procedures in Idle mode and RRC Inactive state (Release 16), 3GPP TS 38.304 V16.2.0, Sep. 2020, 304 pages.

3rd Generation Partnership Project; Technical Specification Group Radio Access Network; NR; User Equipment (UE) procedures in Idle mode and RRC Inactive state (Release 16), 3GPP TS 38.331 V16.2.0, Sep. 2020, 921 pages.

* cited by examiner

SIGNALING CHARACTERISTIC EVALUATION RELAXATION FOR USER EQUIPMENT POWER SAVING

CROSS REFERENCE TO RELATED APPLICATION

This application is the U.S. National Phase of PCT Application No. PCT/CN2020/119869, filed Oct. 8, 2020, the disclosure of which is incorporated by reference.

BACKGROUND

Developing Third Generation Partnership Project (3GPP) technologies include enhancements on power-saving techniques for connected-mode user equipments (UEs). These enhancements may be subject to reducing impact to system performance.

DETAILED DESCRIPTION

Figure 1:
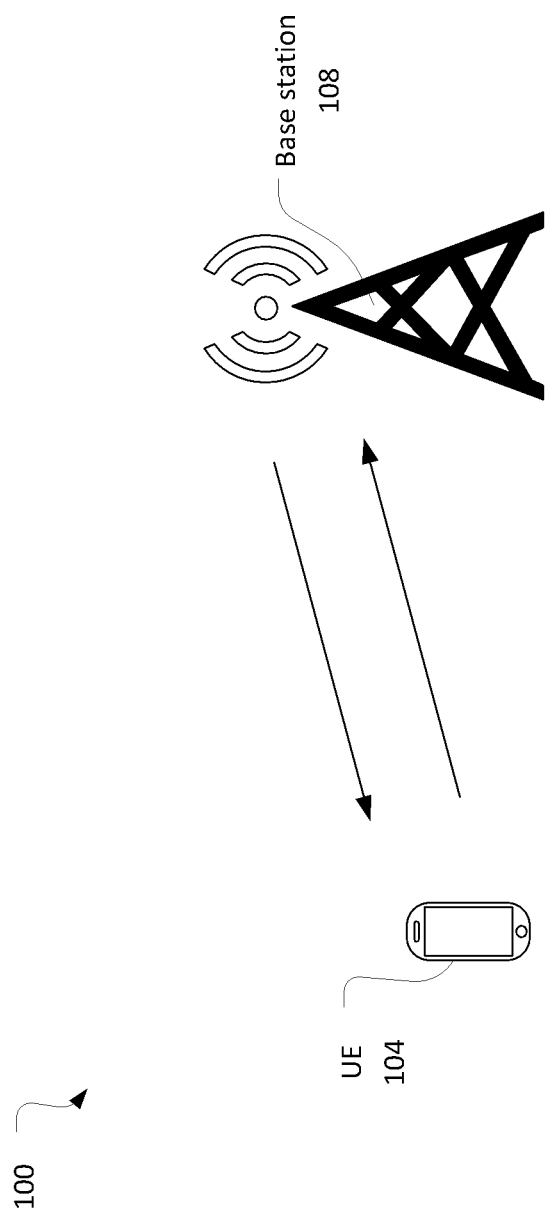
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a UE 104 and a base station 108. The base station 108 may provide one or more wireless access cells, for example, 3GPP New Radio "NR" cells, through which the UE 104 may communicate with the base station 108. The UE 104 and the base station 108 may communicate over an air interface compatible with 3GPP technical specifications such as those that define Fifth Generation (5G) NR system standards. The base station 108 may be a next-generation-radio access network (NG-RAN) node that is coupled with a 5G core network. An NG-RAN nodes may be either a gNB to provide an NR user plane and control plane protocol terminations toward the UE 104 or an ng-eNB to provide evolved universal terrestrial radio access (E-UTRA) user plane and control plane protocol terminations toward the UE 104. The network environment 100 may include a number of other RAN nodes (for example, long term evolution (LTE)-RAN or NG-RAN nodes), transmit-receive points, etc. that may support wireless coverage for the UE 104.

In operation, the UE 104 may cycle through a number of radio resource control (RRC) modes. The UE 104 may start in an RRC-idle mode when it first camps on a cell provided by the base station 108. This may be when the UE 104 is powered on or subject to an inter-system switch from an LTE cell. The UE 104 may perform an RRC setup procedure to transition to an RRC-connected mode in which the UE 104 may establish a logical connection with the base station 108. In the RRC-connected mode, the UE 104 may be configured with a signaling radio bearer (SRB) and one or more data radio bearers (DRBs). The UE 104 may transition to an RRC-inactive mode in which case the base station 108 may preserve various connections with the 5G core network and the UE context. The UE 104 may also transition to an RRC-idle mode to more completely release the connection.

While in the connected mode, the UE 104 may perform various signaling characteristic evaluation (SCE) operation. An SCE operation may include, but is not limited to, radio link monitoring (RLM) operations and beam failure detection (BFD) operations. For example, the UE 104 may monitor a downlink (DL) radio link quality in active DL bandwidth parts (BWPs) on a primary cell. If the UE 104 is configured with a secondary cell group (SCG) and a parameter rlf-TimersAndConstants is provided and not set to release, the UE 104 may also monitor DL radio link quality in active DL BWPs of a primary SCG cell (PSCell).

The base station 108 may configure a set of reference signals (RSs) for the UE 104 to measure for SCE operations. In some embodiments, the base station 108 may use a RadioLinkMonitoringRS to configure a set of RSs for the UE 104 to measure for an RLM operation. These may be referred to as RLM-RSs. Detection RSs, for example, channel state information-reference signal (CSI-RS), synchronization signal block (SSB), or a combination of both, may be configured for RLM or BFD. Beam failure may occur if a change in radio conditions cause an existing beam to become unreliable before the UE is able to switch to a new beam. A radio link failure may occur if a handover procedure fails or if a handover procedure is not initiated when it is required.

In some embodiments, the UE 104 may not be specifically configured with RLM-RSs, for example, may not be provided RadioLinkMonitoringRS. In these embodiments, the UE 104 may determine which RSs to use as RLM-RSs based on other information. For example, the UE 104 may use a reference signal provided for an active transmission configuration indicator (TCI) state for PDCCH reception as the RLM-RS if the active TCI state for PDCCH reception includes only one reference signal.

SCE operations may be performed by various layers of the UE 104. For example, a physical (PHY) layer (which may also be referred to as Layer 1 (L1)) may generate out-of-sync indications if RLM-RSs fall below a first quality level ($Q_{out}$) at which the radio link is considered unreliable, which may be based on a first block error level rate (BLER) target of a hypothetical PDCCH transmission; generate an in-sync indication if at least one RLM-RS exceeds a second quality level ($Q_{in}$) at which the radio link is considered reliable, which may be based on a second BLER target of the hypothetical PDCCH transmission; and generate a beam failure instance if all RLM-RSs fall below a third quality level ($Q_{out\_LR}$), which may correspond to a BLER of 10% for the hypothetical PDCCH transmission. The out-of-sync and in-sync indications may be provided to an RRC layer and the beam failure instances may be provided to a media access control (MAC) layer.

The RRC layer of the UE 104 may provide first configuration information to the PHY layer (for example, the set of resources for the RLM-RSs and BLER thresholds for $Q_{in}$ and $Q_{out}$) and may provide second configuration information to the MAC layer (for example, beam failure and beam failure recovery parameters). The RRC layer may also evaluate conditions for radio link failure based on the out-of-sync and in-sync indications from the physical layer. If conditions warrant, the RRC layer may trigger a radio link failure and RRC reestablishment. In some embodiments, the UE 104 may be configured with a pair of BLER targets to be used for RLF detection. An out-of-sync BLER, $BLER_{out}$, may correspond to the first quality level, $Q_{out}$, at which the radio link is considered unreliable. An in-sync BLER, $BLER_{in}$, may correspond to the second quality level, $Q_{in}$, at which the radio link is considered reliable. In some embodiments, $BLER_{out}$ may be set at 10% and $BLER_{in}$ may be set at 2%.

The MAC layer may evaluate conditions for beam failure based on beam failure instances provided by the PHY layer. If conditions warrant, the MAC layer may trigger beam failure and beam failure recovery.

Two values may be defined for RLM operations. A first value, which may be referred to as an L1 measurement interval ($T_{indication\_interval}$), may set an interval of two successive indications from Layer 1 (for example, the in-sync or out-of-sync indications transmitted by the PHY layer). The L1 measurement interval value may be based on a discontinuous reception (DRX) configuration. DRX may allow the UE 104 to enter a DRX-inactive state during periods of inactivity. In the DRX-inactive state, the UE 104 may not be required to monitor the PDCCH and may, therefore, power down certain receive circuitry. The UE 104 may periodically transition to a DRX-active state to monitor the PDCCH to determine whether it is to receive a downlink resource allocation. The UE 104 may also enter the DRX-active state to send a scheduling request to initiate an uplink data transfer.

A DRX cycle may define the relative time the UE 104 is in the DRX active and inactive states. The UE 104 may alter between short DRX cycles and long DRX cycles based on level of activity. A DRX cycle may have an overall length of, for example, 10, 20, 32, 40, 60, 64, 70, 80, 128, 160, 256, 320, 512, 640, 1024, 1280, 2048, 2560, 5120, or 10,240 ms. An offset that defines the DRX cycle start location may be in multiples of 1 ms. For example, a DRX cycle 40 ms, offset 10 ms, will start at 10 ms, 50 ms, etc. The equation used to calculate DRX cycle may be [(SFN*10)+subframe number] mod (longDRX_cycle)=(drxStartOffset).

In related art, when DRX is not used, $T_{indication\_interval}$ may be set to max (10 milliseconds (ms), $T_{RLM-RS,M}$), where $T_{RLM-RS,M}$ is a shortest periodicity of all configured RLM-RS resources for a monitored cell. When DRX is used and a DRX cycle length, $DRX_{cycle\_length}$, is less than or equal to 320 ms, $T_{indication\_interval}$ may be set to max (10 ms, 1.5× $DR_{cycle\_length}$, 1.5×$T_{RLM-RS,M}$). When DRX is used and the DRX cycle length, $DRX_{cycle\_length}$, is greater than 320 ms, $T_{indication\_interval}$ may be set to $DRX_{cycle\_length}$.

The second value that may be defined for RLM operations is an evaluation period that may set the granularity of a higher layer determination, for example, when the RRC layer determines whether a radio link failure is triggered. Separate evaluation periods may be defined based on whether the RLM measurements are based on CSI-RS or SSB. The evaluation period may be based on: a sharing factor, P, that indicates how a reference signal is shared between different measurement needs; an out-of-sync parameter, $M_{out}$; and an in-sync parameter, $M_{in}$. $M_{out}$ may be set to 20 and $M_{in}$ may be set to 10 if, for example, a CSI-RS resources is configured for RLM and transmitted with higher layer CSI-RS parameter density set to 3 and has a bandwidth equal to or over 24 physical resource blocks.

A scaling factor of 1.5 may be used in calculation of the RLM values to account for potential mismatches of DRX cycle with the CSI-RS/SSB periodicity.

Release 16 of 3GPP standards have defined downlink control information (DCI) format 2_6 for UE power savings. Briefly, the DCI format 2_6 may be used to allow the UE 104 to avoid waking up, for example, transitioning to DRX-active state, in some situations. However, in Release 16, even if a wake-up signal (WUS) indicates that a UE can skip a DRX-active state of a DRX cycle, it may still need to wake up to perform an RLM measurement. Thus, embodiments of the present disclosure describe relaxation of RLM measurements (and other SCE measurements) to leverage additional power savings without compromising performance.

Figure 2:
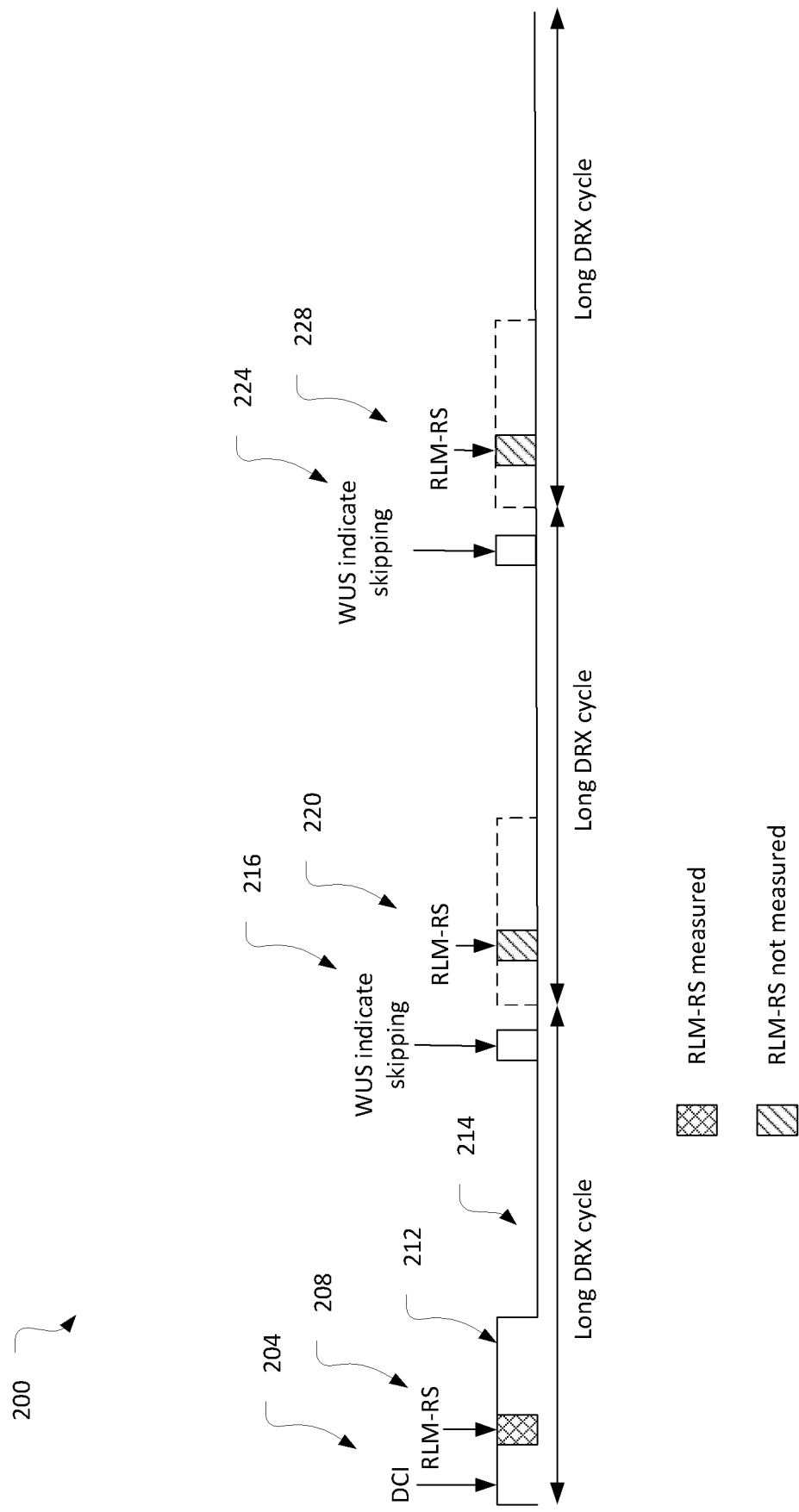
FIG. 2 is a timing diagram illustrating aspects in accordance with some embodiments.

FIG. 2 illustrates a timing diagram 200 in accordance with some embodiments. The timing diagram 200 illustrates three long DRX cycles. In a DRX-active state 212 of the first DRX cycle, the UE 104 may receive a DCI 204 and an RLM-RS 208. The DRX-active state 212 may also be referred to as an on-duration 212. The UE 104 may measure the RLM-RS 208 for an RLM operation.

The first DRX cycle may also include a DRX-inactive state 214. The DRX-inactive state 214 may also be referred to as an off-duration 214. Toward the end of the DRX-inactive state 214, the UE 104 may receive a WUS 216 to indicate skipping. The UE 104 may have knowledge of the timing of the WUS 216 and may therefore activate out of the DRX-inactive state 214 to receive the WUS 216. The WUS 216 may be a DCI with cyclic redundancy check (CRC) scrambled by a power saving-radio network temporary identifier (DCP). The WUS 216 may be configured to the UE 104 by a DCP configuration element.

The WUS 216 may indicate that, from the DRX perspective, the UE 104 does not need to transition to a DRX-active state for the second DRX cycle. However, RLM-RS 220 may be transmitted, or at least scheduled, during the second long DRX. While Release 16 UEs would be required to transition to the DRX-active state to measure the RLM-RS 220, the UE 104 may be configured with relaxed RLM parameters that allow it to skip the measurement of the RLM-RS 220. Thus, the UE 104 may remain in the DRX inactive state during the scheduled on-duration of the second long DRX cycle.

In a similar manner, the UE 104 may receive a WUS 224 at the end of the second long DRX cycle that indicates that the UE 104 can skip the DRX-active state of the third DRX cycle. The UE 104 may, therefore, not measure the RLM-RS 228. This may be based on the assumption that the relaxed RLM parameters allow for the further delay in the RLM measurements.

When DRX cycles are small, RLM operations may take a large portion of UE power consumption. In some embodiments, when the network configure small DRX cycles, for example, 20 ms, 40 ms, 60 ms, or 80 ms, the offset may be adjusted to align an on duration of a DRX cycle with either the SSB or CSI-RS to enable UE power saving. In some embodiments, the network may additionally configure the RLM-RS to align with the WUS location to enable the UE 104 to efficiently receive both when needed.

In some embodiments, when a WUS or dynamic DCI monitoring indicates that an on-duration of a DRX cycle may be skipped, the RLM measurements may also be skipped for UE power saving. Relaxation of RLM parameters may be especially useful for lower frequency ranges, for example, frequency range (FR) 1-410 megahertz (MHz) to 7,125 MHz, and may be based on, or otherwise influenced by, DRX configuration.

In some embodiments, relaxation of the RLM parameters may be based on situations in which the radio link metrics are favorable and not expected to quickly deteriorate. For example, if receive power and quality are over preconfigured thresholds and the UE 104 is determined to be in a low-mobility mode or not at an edge of a cell, the RLM parameters may be relaxed. The UE 104 may be determined to be in a low-mobility mode if it meets preconfigured low-mobility criterion. Similarly, the UE 104 may be determined to not be located in an edge region of the cell if it meets cell-edge criterion. In some embodiments, the low-mobility or cell-edge criterion may be used for determining whether relaxed RLM parameters are appropriate for the UE 104 when it is in connected mode.

In some embodiments, the UE 104 may be configured with relaxed RLM parameters through a UE-specific RRC configuration when, for example, DCP is configured. A DCP configuration element (DCP-Config) providing relaxed RLM parameters is shown as follows.

RLMBFD parameters described herein. Q is shown as being 2, 3, 4, or 5; however, in other embodiments, other values may be used.

The lowMobilityEvaluation field may provide low-mobility criterion including, for example, an s-SearchDeltaP field and a t-SearchDeltaP field. The s-SearchDeltaP field may provide a power differential and the t-SearchDeltaP field may define a time. If the UE 104 measures reference signal power that does not change more than the given power threshold in the given time, the UE 104 may be considered to meet the low-mobility criterion.

The cellEdgeEvaluation field may provide the cell-edge criterion including, for example, an s-SearchThresholdP and an s-SearchThresholdQ. The s-SearchThresholdP may provide a Srxlev threshold (in decibels (dB)) for a relaxed measurement. Srxlev may be a receive level value (for example, reference signal receive power (RSRP)) measured by the UE 104. The s-SearchThresholdQ may provide a Squal threshold for a relaxed measurement. Squal may be a quality level value (for example, reference signal receive quality (RSRQ)) measured by the UE 104. If the UE 104 measures reference signal quality or power above the cor-

```
DCP-Config ::=            SEQUENCE {
  ps-RNTI                   RNTI-Value,
  ps-Offset                 ENUMERATED {ms0dot125, ms0dot25, ms0dot5, ms1, ms2,
                              ms3, ms4, ms5, ms6, ms7, ms8, ms9, ms10, ms11, ms12,
                              ms13, ms14, spare15, spare14, spare13, spare12, spare11,
                              spare10, spare9, spare8, spare7, spare6, spare5, spare4,
                              spare3, spare2, spare1},
  sizeDCI-2-6               INTEGER (1..maxDCI-2-6-Size-r16),
  ps-PositionDCI-2-6        INTEGER (0..MAXdci-2-6-Size-1),
  ps-WakeUp                 ENUMERATED {true}       OPTIONAL, -- Need S
  ps-TransmitPeriodicL1-RSRP ENUMERATED {true}      OPTIONAL, -- Need S
  ps-TransmitPeriodicCSI    ENUMERATED {true}       OPTIONAL, -- Need S
  ps-RLMBFD-relaxation      ENUMERATED {2, 3, 4, 5} OPTIONAL, -- Need S
  ps-lowMobilityEvaluation  SEQUENCE {
    s-SearchDeltaP            ENUMERATED {
                                db3, db6, db9, db12, db15, spare3, spare 2,
                                spare 1}            OPTIONAL, -- Need S
    t-SearchDeltaP            ENUMERATED {
                                s5, s10, s20, s30, s60, s120, s180, s240, s300,
                                spare7, spare6, spare5, spare 4, spare3, spare 2,
                                spare 1}            OPTIONAL, -- Need S
  }
  ps-cellEdgeEvaluation     SEQUENCE {
    s-SearchThresholdP        ReselectionThreshold  OPTIONAL, -- Need R
    s-SearchThreshodQ         ReselectionThresholdQ OPTIONAL, -- Need R
  }                                                 OPTIONAL, --Cond OptMandatory
}
```

The ps-WakeUp field may indicate whether the UE 104 is to wake up if DCI format 2_6 is not detected outside of active time. If the field is absent, the UE 104 may not need to wake up if the DCI format 2_6 is not detected outside the active time.

The ps-PositionDCI-2-6 field may provide the wake-up indication location for the UE 104. When the wake-up indication bit is set to zero, the UE 104 may skip the on-duration of the current DRX cycle. It may be noted that the definition of the current DRX cycle may include the relevant WUS, which may technically be transmitted in a prior DRX cycle. For example, with reference to FIG. 2, WUS 216 may be part of the second DRX cycle even if it is technically transmitted in the first DRX cycle.

The remaining fields of the DCP-Config element may be similar to like-named fields described in 3GPP Technical Specification (TS) 38.331 v16.1.0 (2020-07).

The ps-RLMBFD-Relaxation field may define a relaxation factor (Q) that may be used to calculate various responding thresholds, the UE 104 may be considered to meet the cell-edge criterion and the UE 104 may determine, for example, that it is not located in an edge region of a cell.

In some embodiments, the relaxed RLMBFD parameters may be signaled in a physical cell group configuration element, PhysicalCellGroupConfig. This may be used to apply to cases with or without DRX configuration for RLMBFD in FR1, for example. In some embodiments, the relaxed RLMBFD field, ps-RLMBFD-relaxation, shown above may be provided in the PhysicalCellGroupConfig directly and not as part of the DCP configuration element.

The relaxation factor, Q, may be used to calculate an evaluation period for RLM operations based on CSI-RS as shown in Table 1 and based on SSB as shown in Table 2. Q may be signaled in system information block (SIB) or RRC signaling.

TABLE 1

| Configuration | $T_{Evaluate\_out\_CSI-RS}$ (ms) | $T_{Evaluate\_in\_CSI-RS}$ (ms) |
|---|---|---|
| No DRX | Max(200, Ceil($M_{out}$ × P × Q) × $T_{CSI-RS}$) | Max(100, Ceil($M_{in}$ × P × Q) × $T_{CSI-RS}$) |
| DRX ≤ 320 ms | Max(200, Ceil(1.5 × Q × $M_{out}$ × P) × Max($T_{DRX}$, $T_{CSI-RS}$)) | Max(100, Ceil(1.5 × Q × $M_{in}$ × P × Max($T_{DRX}$, $T_{CSI-RS}$)) |
| DRX > 320 ms | Ceil($M_{out}$ × P) × $T_{DRX}$ | Ceil($M_{in}$ × P) × $T_{DRX}$ |

$T_{Evaluate\_out\_CSI-RS}$ may be the evaluation period in which the UE 104 has to determine whether the downlink radio link quality on the configured RLM-RS resource becomes worse than the out-of-sync quality threshold, $Q_{out}$. $T_{Evaluate\_in\_CSI-RS}$ may be the evaluation period in which the UE 104 has to determine whether the downlink radio link quality on the configured RLM-RS resource becomes better than the in-sync quality threshold, $Q_{in}$. In this embodiment, the configured RLM-RS resource is a configured CSI-RS resource.

$T_{CSI-RS}$ may be the periodicity of the CSI-RS resource configured for RLM. The parameters of this table apply for $T_{CSI-RS}$ equal to, for example, 5 ms, 10 ms, 20 ms, or 40 ms. $T_{DRX}$ may be the DRX cycle length, which may also be referred to as $DRX_{cycle\_length}$.

The relaxation factor may be further used to determine the L1 measurement interval for CSI-RS-based RLM measurements. For example, when DRX is used, the $T_{indication\_interval}$ may be the max (10 ms, 1.5× $DRX_{cycle\_length}$, 1.5×Q×$T_{RLM-RS,M}$)) if $DRX_{cycle\_length}$ is less than or equal to 320 ms and $T_{indication\_interval}$ is equal to $DRX_{cycle\_length}$ if $DRX_{cycle\_length}$ is greater than 320 ms. $T_{RLM-RS,M}$ may correspond to $T_{CSI-RS}$ in this embodiment.

In some embodiments, $T_{indication\_interval}$ may be set to Q×max(10 ms, $T_{RLM-RS,M}$) when DRX is not used.

In some embodiments, aligning DRX cycle and offset with CSI-RS configuration of the active state may facilitate power savings for the UE 104. This may increase the number of DRX-active periods that naturally incorporate the CSI-RS without requiring the UE 104 to power-on during the DRX-inactive periods.

In some embodiments, when a DCI format 2_6 WUS indicates that the UE 104 may skip multiple on-durations, an RLM measurement constraint may ultimately be imposed. For example, in some embodiments, the UE 104 may perform an RLM measurement in at least one out of Q DRX cycles/CSI-RS periodicities.

The relaxation factor, Q, may be used to calculate an evaluation period for RLM operations based on SSB as shown in Table 2.

TABLE 2

| Configuration | $T_{Evaluate\_out\_SSB}$ (ms) | $T_{Evaluate\_in\_SSB}$ (ms) |
|---|---|---|
| No DRX | Max(200, Ceil(10 × P × Q) × $T_{SSB}$) | Max(100, Ceil(5 × P × Q) × $T_{SSB}$) |
| DRX ≤ 320 ms | Max(200, Ceil(15 × P × Q) × Max($T_{DRX}$, $T_{SSB}$)) | Max(100, Ceil(7.5 × P × Q) × Max($T_{DRX}$, $T_{SSB}$)) |
| DRX > 320 ms | Ceil(10 × P) × $T_{DRX}$ | Ceil(5 × P) × $T_{DRX}$ |

$T_{Evaluate\_out\_SSB}$ may be an out-of-sync evaluation period in which the UE 104 has to determine whether the downlink radio link quality on the configured RLM-RS resource becomes worse than the out-of-sync quality threshold, $Q_{out}$. $T_{Evaluate\_out\_SSB}$ may be the evaluation period in which the UE 104 has to determine whether the downlink radio link quality on the configured RLM-RS resource becomes better than the in-sync quality threshold, $Q_{in}$. In this embodiment, the configured RLM-RS resource is a configured SSB resource.

$T_{SSB}$ may be the periodicity of the SSB resource configured for RLM. $T_{DRX}$ may be the DRX cycle length.

The relaxation factor may be further used to determine the L1 measurement interval for SSB-based RLM measurements. For example, when DRX is used, the $T_{indication\_interval}$ may be the max(10 ms, 1.5×Q× $DRX_{cycle\_length}$, 1.5×Q×$T_{RLM-RS,M}$) if $DRX_{cycle\_length}$ is less than or equal to 320 ms and $T_{indication\_interval}$ is equal to $DRX_{cycle\_length}$ if $DRX_{cycle\_length}$ is greater than 320 ms. $T_{RLM-RS,M}$ may correspond to $T_{SSB}$ in this embodiment.

In some embodiments, $T_{indication\_interval}$ may be set to Q×max(10 ms, $T_{RLM-RS,M}$) when DRX is not used.

In some embodiments, aligning DRX cycle and offset with SSB configuration of the active state may facilitate power savings for the UE 104. This may increase the number of DRX-active periods that naturally incorporate the SSB without requiring the UE 104 to power-on during the DRX-inactive periods.

In some embodiments, when a WUS (for example, a DCI format 2_6) indicates that the UE 104 may skip multiple on-durations, an RLM measurement constraint may ultimately be imposed. For example, in some embodiments, the UE 104 may perform an RLM measurement in at least one out of Q DRX cycles/SSB periodicities.

In some embodiments, the RLM operation may be relaxed in other manners. For example, in some embodiments, a least common multiplier (LCM) value may be used to calculate an evaluation period for RLM operations based on CSI-RS as shown in Table 1 and based on SSB as shown in Table 2.

TABLE 3

| Configuration | $T_{Evaluate\_out\_CSI-RS}$ (ms) | $T_{Evaluate\_in\_CSI-RS}$ (ms) |
|---|---|---|
| No DRX | Max(200, Ceil($M_{out}$ × P) × $T_{CSI-RS}$) | Max(100, Ceil($M_{in}$ × P) × $T_{CSI-RS}$) |
| DRX ≤ 320 ms | Max(200, Ceil($M_{out}$ × P) × LCM($T_{DRX}$, $T_{CSI-RS}$)) | Max(100, Ceil($M_{in}$ × P) × LCM($T_{DRX}$, $T_{CSI-RS}$)) |
| DRX > 320 ms | Ceil($M_{out}$ × P) × $T_{DRX}$ | Ceil ($M_{in}$ × P) × $T_{DRX}$ |

The parameters of Table 3 may be similar to like-named parameters discussed with respect to Table 1. However, in Table 3, the LCM($T_{DRX}$, $T_{CSI-RS}$) replaces max($T_{DRX}$, $T_{CSI-RS}$) and the "1.5×Q" value is dropped for determining the time periods when $DRX_{cycle\_length}$ is less than or equal to 320 ms. The value Q is also dropped when no DRX is used.

Utilizing the LCM of the DRX and CSI-RS periodicities in this manner may provide an efficient manner of relaxing the RLM operations in many scenarios. However, in some scenarios, it may not relax the RLM operations as well as that described above with respect to Tables 1 and 2. For example, when LCM($T_{DRX}$, $T_{CSI-RS}$)=max($T_{DRX}$, $T_{CSI-RS}$) the timing is actually tightened without the 1.5 factor. Therefore, in some embodiments, the 1.5 multiplier is kept as shown in Table 4, for example.

TABLE 4

| Configuration | $T_{Evaluate\_out\_CSI-RS}$ (ms) | $T_{Evaluate\_in\_CSI-RS}$ (ms) |
| --- | --- | --- |
| No DRX | Max(200, Ceil($M_{out}$ × P) × $T_{CSI-RS}$) | Max(100, Ceil($M_{in}$ × P) × $T_{CSI-RS}$) |
| DRX ≤ 320 ms | Max(200, Ceil(1.5 × $M_{out}$ × P) × LCM($T_{DRX}$, $T_{CSI-RS}$)) | Max(100, Ceil(1.5 × $M_{in}$ × P) × LCM($T_{DRX}$, $T_{CSI-RS}$)) |
| DRX > 320 ms | Ceil($M_{out}$ × P) × $T_{DRX}$ | Ceil($M_{in}$ × P) × $T_{DRX}$ |

An LCM parameter may also be used for relaxing an RLM measurement based on SSB.

TABLE 5

| Configuration | $T_{Evaluate\_out\_SSB}$ (ms) | $T_{Evaluate\_in\_SSB}$ (ms) |
| --- | --- | --- |
| No DRX | Max(200, Ceil(10 × P) × $T_{SSB}$) | Max(100, Ceil(5 × P) × $T_{SSB}$) |
| DRX ≤ 320 ms | Max(200, Ceil(15 × P) × LCM($T_{DRX}$, $T_{SSB}$)) | Max(100, Ceil(7.5 × P) × LCM($T_{DRX}$, $T_{SSB}$)) |
| DRX > 320 ms | Ceil(10 × P) × $T_{DRX}$ | Ceil(5 × P) × $T_{DRX}$ |

The parameters of Table 5 may be similar to like-named parameters discussed with respect to Table 2. However, in Table 5, the LCM($T_{DRX}$, $T_{SSB}$) replaces max($T_{DRX}$, $T_{SSB}$) and the "Q" value is dropped for determining the time periods when $DRX_{cycle\_length}$ is less than or equal to 320 ms. The value Q is also dropped when no DRX is used.

In some embodiments, using the LCM as described above with respect to Tables 3-5 may not allow relaxation window DRX is configured or when the RLM-RS and on duration have constant offsets.

While the embodiments describe relaxing RLM operations, other embodiments may apply similar concepts to other SCE operations. For example, in some embodiments the relaxation factor may be configured and used for neighbor cell measurement relaxation in active mode.

The relaxation factor (Q) may be applied to various requirements defined with respect to neighbor cell measurements described in, for example, section 9.2.5.2 of 3GPP TS 38.133 v16.4.0 (2020-06). In one example, the measurement periods for intra-frequency measurements without gaps in FR1 may be modified as shown below in Table 6.

TABLE 6

| Rx Cycle | T SSB_measurement_period_intra |
| --- | --- |
| No DRX | max(200 ms, Ceil(5 × Q × $K_p$) × SMTC period) × $CSSF_{intra}$ |
| DRX ≤ 320 ms | max(200 ms, Ceil(1.5 × 5 × Q × $K_p$) × max(SMTC period, $DRX_{cycle\_length}$)) × $CSSF_{intra}$ |
| DRX > 320 ms | Ceil(5 × $K_p$) × $DRX_{cycle\_length}$ × $CSSF_{intra}$ |

SMTC may be a period of the SSB-based measurement timing configuration. CSSFintra may be an intra-frequency carrier-specific scaling factor. If different SMTC periodicities are configured for different cells, the SMTC period in Table 5 may be the one used by the cell being identified (for example, the neighbor cell).

When intra-frequency SMTC is fully non-overlapping with measurement gaps or intra-frequency SMTC is fully overlapping with measurement gaps (MGs), Kp=1. When intra-frequency SMTC is partially overlapping with MGs, Kp=1/(1−(SMTC period/measurement gap repetition period (MGRP))), where SMTC period<MGRP.

Instead of relying on the relaxation factor (Q), some embodiments may relax the neighbor cell measurements using LCM. In one example, the measurement periods for intra-frequency measurements without gaps in FR1 may be modified as shown below in Table 7.

TABLE 7

| Rx Cycle | T SSB_measurement_period_intra |
| --- | --- |
| No DRX | max(200 ms, Ceil(5 × $K_p$) × SMTCperiod) × $CSSF_{intra}$ |
| DRX ≤ 320 ms | Max(200 ms, Ceil(5 × $K_p$) × LCM(SMTCperiod, $DRX_{cycle\_length}$)) × $CSSF_{intra}$ |
| DRX > 320 ms | Ceil(5 × $K_p$) × $DRX_{cycle\_length}$ × $CSSF_{intra}$ |

The parameters of Table 7 may be similar to like-named parameters described above with respect to Table 6. However, Table 7 replaces the max function with an LCM function for cases in which the DRX cycle length is equal to or less than 320 ms. Table 7 further removes the relaxation factor (Q) when no DRX is used.

Figure 3:
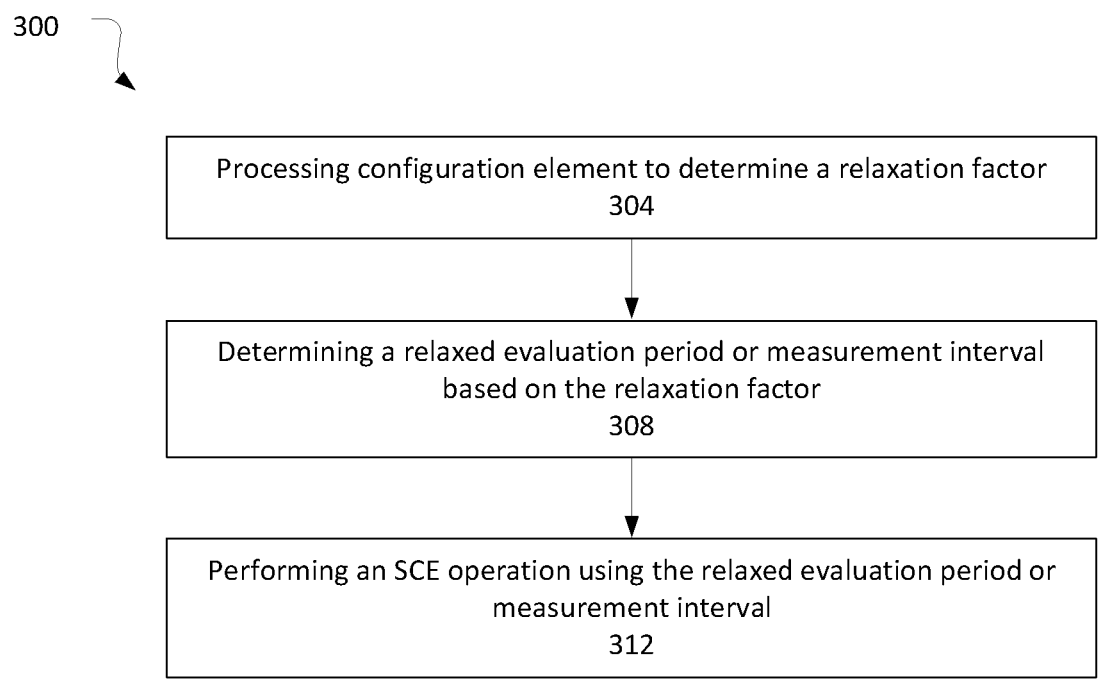
FIG. 3 illustrates an operational flow/algorithmic structure in accordance with some embodiments.

FIG. 3 illustrates an operation flow/algorithmic structure 300 in accordance with some embodiments. The operation flow/algorithmic structure 300 may be performed or implemented by a UE such as, for example, UE 104 or UE 700; or components thereof, for example, baseband processor 704A.

The operation flow/algorithmic structure 300 may include, at 304, processing a configuration element to determine a relaxation factor. In some embodiments, the configuration element may be transmitted in SIB or RRC signaling. The configuration element may be a DCP configuration element, or a physical cell configuration element. In some embodiments, the relaxation factor may be an enumerated value such as, but not limited to, 2, 3, 4, or 5.

The operation flow/algorithmic structure 300 may further include, at 308, determining relaxed evaluation periods or L1 measurement interval based on the relaxation factor.

In some embodiments, the relaxed evaluation periods may include an in-sync (IS) evaluation period, which may be a period in which the UE 104 has to determine whether the downlink radio quality on a configured RLM-RS resource becomes better than the IS quality threshold.

If the RLM-RS is a CSI-RS, the IS evaluation period may be equal to max(100, Ceil(1.5×Q×Mn×P)×Max($T_{DRX}$, $T_{CSI-RS}$)), when $T_{DRX}$ is less than or equal to 320 ms. The IS evaluation period may be equal to max(100, Ceil($M_{in}$×P×Q)×$T_{CSI-RS}$) when DRX is not used.

If the RLM-RS is an SSB, the IS evaluation period may be equal to max(100, Ceil(7.5×P×Q)×Max($T_{DRX}$, $T_{SSB}$)), when $T_{DRX}$ is less than or equal to 320 ms. The IS evaluation period may be equal to max(100, Ceil(5×P×Q)×$T_{SSB}$) when DRX is not used.

In some embodiments, the relaxed evaluation periods may include an out-of-sync (OOS) evaluation period, which may be a period in which the UE 104 has to determine whether the downlink radio quality on a configured RLM-RS resource becomes worse than the OOS quality threshold.

If the RLM-RS is a CSI-RS, the OOS evaluation period may be equal to max(200, Ceil(1.5×Q×$M_{out}$×P)×Max($T_{DRX}$, $T_{CSI-RS}$)) when $T_{DRX}$ is less than or equal to 320 ms. The OOS evaluation period may be equal to max(200, Ceil($M_{out}$×P×Q)×$T_{CSI-RS}$) when DRX is not used.

If the RLM-RS is an SSB, the OOS evaluation period may be equal to max(200, Ceil(15×P×Q)×max($T_{DRX}$, $T_{SSB}$)) when $T_{DRX}$ is less than or equal to 320 ms. The OOS evaluation period may be equal to max(200, Ceil(10×P×Q)×$T_{SSB}$) when DRX is not used.

In some embodiments, the L1 measurement interval may be equal to max(10 ms, 1.5×Q×$DRX_{cycle\_length}$, 1.5×Q× $T_{RLM-RS, M}$), if $DRX_{cycle\_length}$ is less than or equal to 320 ms. If $DRX_{cycle\_length}$ is greater than 320 ms, the L1 measurement interval may be equal to the $DRX_{cycle\_length}$. If DRX is not used, the L1 measurement interval may be equal to Q×max(10 milliseconds, $T_{RLM-RS, M}$).

The operation flow/algorithmic structure 300 may further include, at 312, performing an SCE operation using the relaxed evaluation period or measurement interval. In some embodiments, the SCE operation may be an RLM operation. The RLM operation may include determining out-of-sync and in-sync indications at the Physical layer, or evaluating conditions for radio link failure and triggering radio link failure and RRC reestablishment at the RRC layer. In other embodiments, the SCE operation may be a BFD operation. The BFD operation may include determining beam failure instances at the Physical layer or evaluating conditions for beam failure and triggering beam failure and beam failure recovery at the MAC layer.

Figure 4:
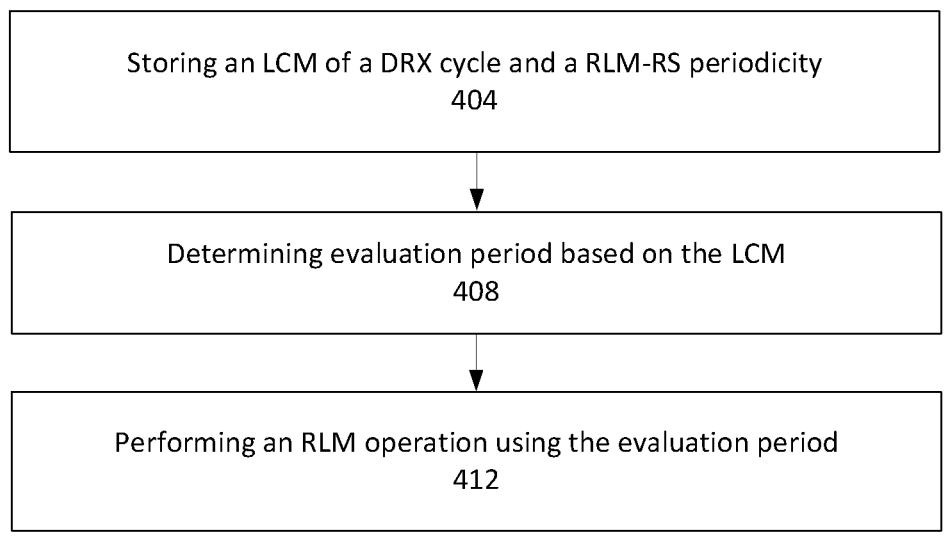
FIG. 4 illustrates another operational flow/algorithmic structure in accordance with some embodiments.

FIG. 4 illustrates an operation flow/algorithmic structure 400 in accordance with some embodiments. The operation flow/algorithmic structure 400 may be performed or implemented by a UE such as, for example, UE 104 or UE 700; or components thereof, for example, baseband processor 704A.

The operation flow/algorithmic structure 400 may include, at 404, storing an LCM of a DRX cycle and an RLM-RS periodicity. The RLM-RS periodicity may be $T_{CSI-RS}$ or $T_{SSB}$ depending on whether the RLM-RS is a CSI-RS or SSB.

The operation flow/algorithmic structure 400 may further include, at 408, determining an evaluation period based on the LCM. The evaluation period may be an IS evaluation period or an OOS evaluation period.

If the RLM-RS is a CSI-RS, the IS evaluation period may be equal to max(100, Ceil($M_{in}$×P)×LCM($T_{DRX}$, $T_{CSI-RS}$)) when $T_{DRX}$ is less than or equal to 320 ms. The IS evaluation period may be equal to max(100, Ceil($M_{in}$×P)×$T_{CSI-RS}$) when DRX is not used.

If the RLM-RS is an SSB, the IS evaluation period may be equal to max(100, Ceil(7.5×P)×LCM($T_{DRX}$, $T_{SSB}$)) when $T_{DRX}$ is less than or equal to 320 ms. The IS evaluation period may be equal to max(100, Ceil(5×P)×$T_{SSB}$) when DRX is not used.

If the RLM-RS is a CSI-RS, the OOS evaluation period may be equal to max(200, Ceil($M_{out}$×P)×LCM($T_{DRX}$, $T_{CSI-RS}$)) when $T_{DRX}$ is less than or equal to 320 ms. The OOS evaluation period may be equal to max(200, Ceil ($M_{out}$×P)×$T_{CSI-RS}$) when DRX is not used.

If the RLM-RS is an SSB, the OOS evaluation period may be equal to max(200, Ceil(15×P)×LCM($T_{DRX}$, $T_{SSB}$)) when $T_{DRX}$ is less than or equal to 320 ms. The OOS evaluation period may be equal to max(200, Ceil(10×P)×$T_{SSB}$) when DRX is not used.

The operation flow/algorithmic structure 400 may further include, at 412, performing an RLM operation using the evaluation period. The RLM operation may be performed as described above.

Figure 5:
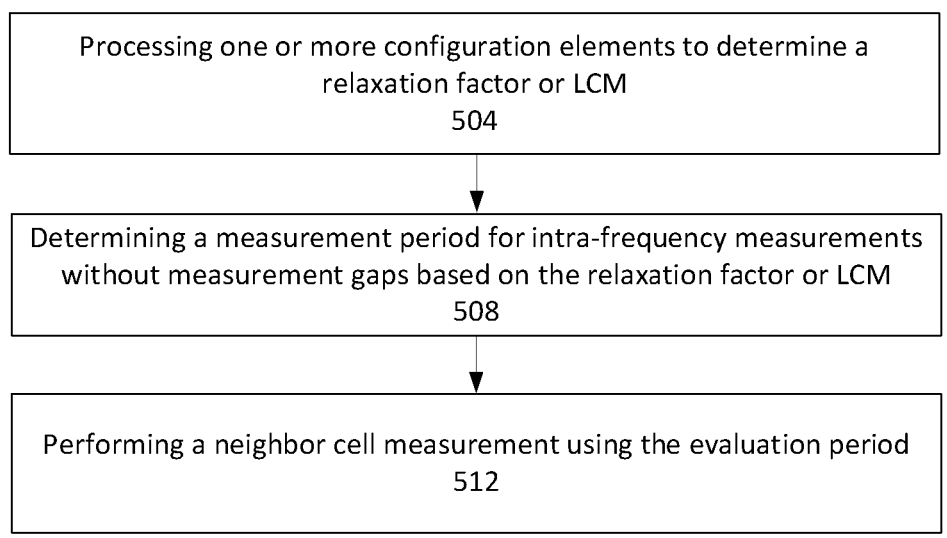
FIG. 5 illustrates another operational flow/algorithmic structure in accordance with some embodiments.

FIG. 5 may include an operation flow/algorithmic structure 500 in accordance with some embodiments. The operation flow/algorithmic structure 500 may be performed or implemented by a UE such as, for example, UE 104 or 700; or components thereof, for example, baseband processor 704A.

The operation flow/algorithmic structure 500 may include, at 504, processing one or more configuration elements to determine a relaxation factor or LCM. The relaxation factor may be determined by being directly indicated in a configuration element (for example, a DCP configuration element or a physical cell configuration element). The LCM may be determined by accessing the constituent parts of the LCM equation from one or more configuration elements. For example, the LCM may be LCM(SMTC period, DRX cycle) and the UE 104 may determine SMTC period and DRX cycle from one or more configuration elements.

The operation flow/algorithmic structure 500 may further include, at 508, determining a measurement period for intra-frequency measurements without measurement gaps based on the relaxation factor or LCM.

Embodiments that use the relaxation factor may determine the measurement period as follows. When discontinuous reception is not used, the measurement period may be determined as being equal to a max(200 milliseconds (ms), ceil(5×Q×$K_p$)×SMTC period)×$CSSF_{intra}$, where $K_p$ is 1 or (1/(1−(SMTC period/MGRP))). When a DRX cycle is less than or equal to 320 ms, the measurement period may be determined as being equal to a max(200 ms, ceil(1.5×5×Q× $K_p$)×max(SMTC period, DRX cycle))×$CSSF_{intra}$.

Embodiments that use the LCM may determine the measurement period as follows. When the DRX cycle is less than or equal to 320 ms, the measurement period may be determined to be equal to max(200 ms, ceil(5×$K_p$)×LCM(SMTC period, DRX cycle)×$CSSF_{intra}$.

The operation flow/algorithmic structure 500 may further include, at 512, performing a neighbor cell measurement using the evaluation period. The neighbor cell measurements may be based on reference signals transmitted in one or more neighbor cells. The reference signals may be in the same frequency band as that of a current serving cell. Thus, the neighbor cell measurements may be intra-frequency measurements. In various embodiments the measurements may be SS-RSRP, SS-RSRQ, or SS-SINR measurements.

The measured reference signals may be SSB signals. SSB-based measurements may be configured along with one or two measurement timing configuration(s) (for example, SMTC(s)), that provide periodicity, duration, and offset information on a window of up to, for example, 5 ms, where the measurements are to be performed.

The UE 104 may generate and send one or more reports based on the measurements performed at 512. The reports may be on a periodic basis, an event triggered basis, or an event-triggered, periodic basis.

Figure 6:
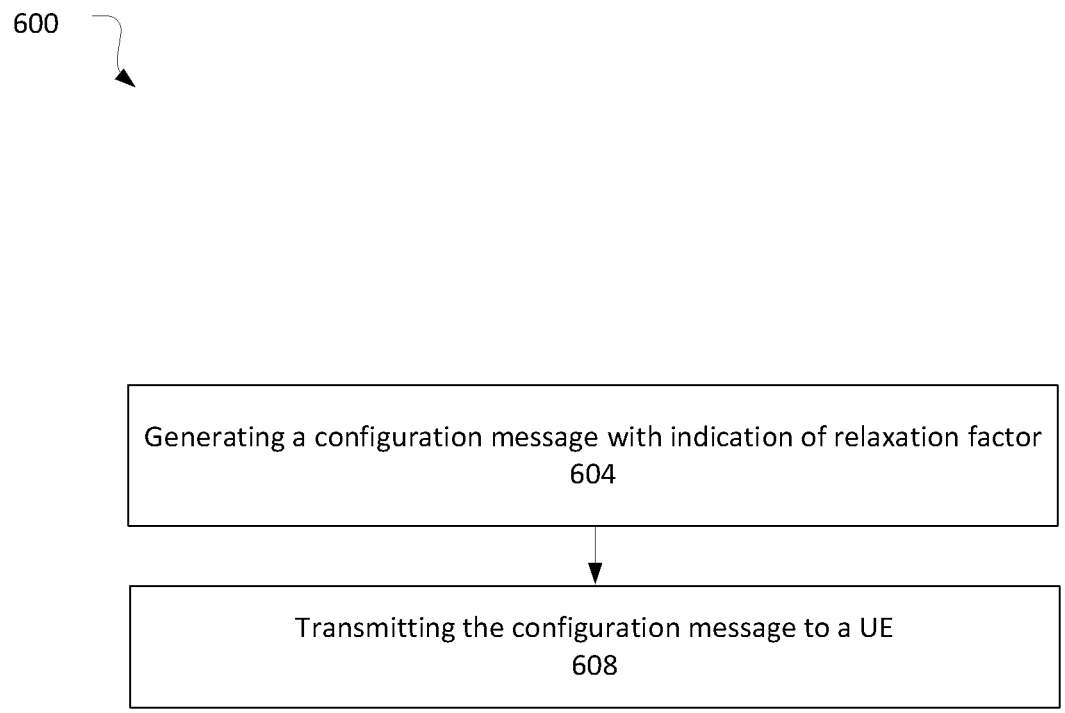
FIG. 6 illustrates another operational flow/algorithmic structure in accordance with some embodiments.

FIG. 6 may include an operation flow/algorithmic structure 600 in accordance with some embodiments. The operation flow/algorithmic structure 600 may be performed or implemented by a base station such as, for example, base station 108 or 800; or components thereof, for example, baseband processor 804A.

The operation flow/algorithmic structure 600 may include, at 604, generating a configuration message with an indication of a relaxation factor. The configuration message may include one or more information elements such as, but not limited to, a DCP configuration element or a physical cell group configuration element. The relaxation factor may be an enumerated value such as, for example, 2, 3, 4, or 5.

The operation flow/algorithmic structure 600 may further include, at 608, transmitting the configuration message to a UE. In some embodiments, the configuration message may be transmitted to the UE when the UE is establishing an RRC connection with the base station. In other embodiments, the configuration message may be transmitted to the UE as part of an update configuration operation.

Figure 7:
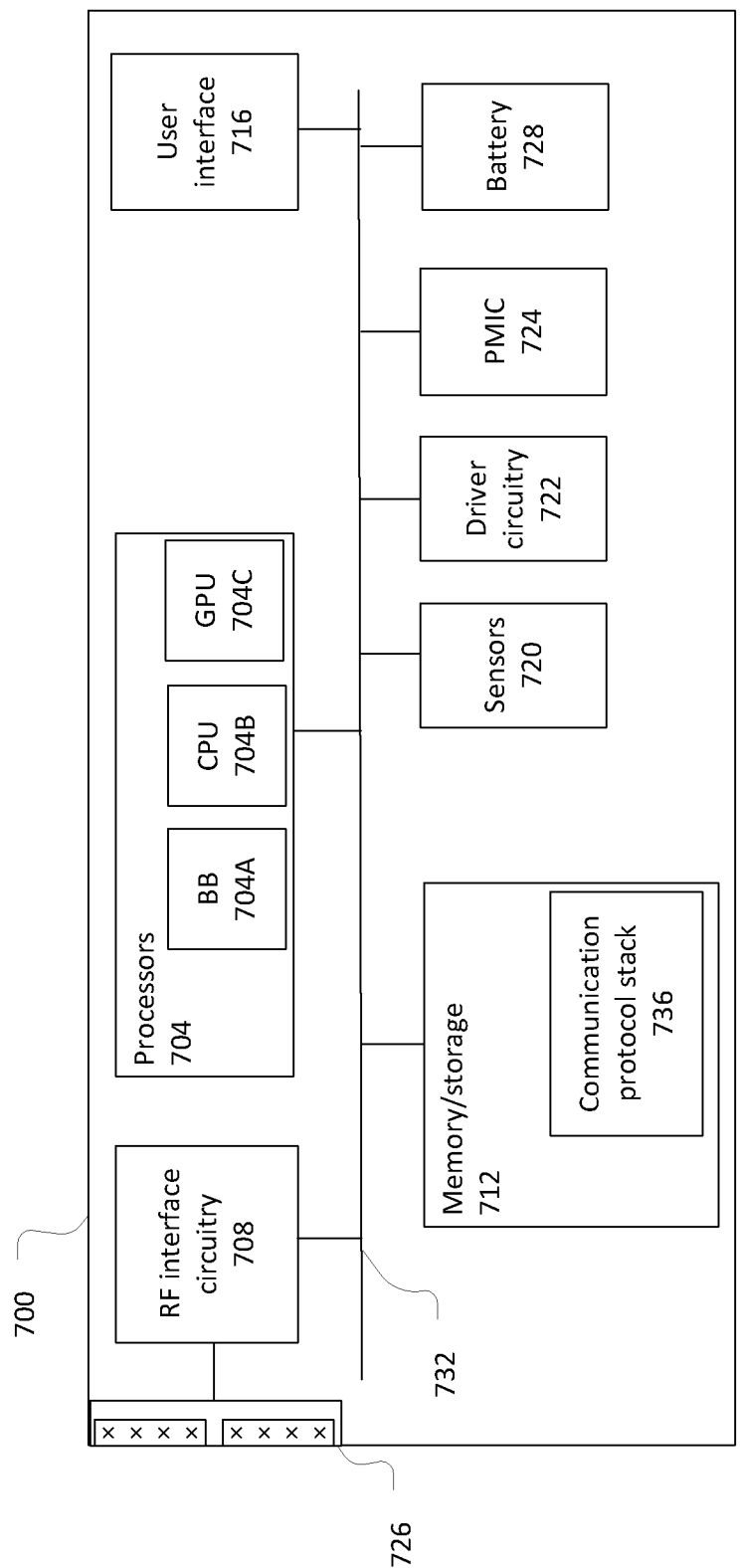
FIG. 7 illustrates a user equipment in accordance with some embodiments.

FIG. 7 illustrates a UE 700 in accordance with some embodiments. The UE 700 may be similar to and substantially interchangeable with UE 104 of FIG. 1.

The UE 700 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices.

The UE 700 may include processors 704, RF interface circuitry 708, memory/storage 712, user interface 716, sensors 720, driver circuitry 722, power management integrated circuit (PMIC) 724, antenna structure 726, and battery 728. The components of the UE 700 may be implemented as integrated circuits (ICs), portions thereof, discrete electronic devices, or other modules, logic, hardware, software, firmware, or a combination thereof. The block diagram of FIG. 7 is intended to show a high-level view of some of the components of the UE 700. However, some of the components shown may be omitted, additional components may be present, and different arrangement of the components shown may occur in other implementations.

The components of the UE 700 may be coupled with various other components over one or more interconnects 732, which may represent any type of interface, input/output, bus (local, system, or expansion), transmission line, trace, optical connection, etc. that allows various circuit components (on common or different chips or chipsets) to interact with one another.

The processors 704 may include processor circuitry such as, for example, baseband processor circuitry (BB) 704A, central processor unit circuitry (CPU) 704B, and graphics processor unit circuitry (GPU) 704C. The processors 704 may include any type of circuitry or processor circuitry that executes or otherwise operates computer-executable instructions, such as program code, software modules, or functional processes from memory/storage 712 to cause the UE 700 to perform operations as described herein.

In some embodiments, the baseband processor circuitry 704A may access a communication protocol stack 736 in the memory/storage 712 to communicate over a 3GPP compatible network. In general, the baseband processor circuitry 704A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 708.

The baseband processor circuitry 704A may generate or process baseband signals or waveforms that carry information in 3GPP-compatible networks. In some embodiments, the waveforms for NR may be based cyclic prefix OFDM "CP-OFDM" in the uplink or downlink, and discrete Fourier transform spread OFDM "DFT-S-OFDM" in the uplink.

The memory/storage 712 may include one or more non-transitory, computer-readable media that includes instructions (for example, communication protocol stack 736) that may be executed by one or more of the processors 704 to cause the UE 700 to perform various operations described herein. The memory/storage 712 include any type of volatile or non-volatile memory that may be distributed throughout the UE 700. In some embodiments, some of the memory/storage 712 may be located on the processors 704 themselves (for example, L1 and L2 cache), while other memory/storage 712 is external to the processors 704 but accessible thereto via a memory interface. The memory/storage 712 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 708 may include transceiver circuitry and radio frequency front module (RFEM) that allows the UE 700 to communicate with other devices over a radio access network. The RF interface circuitry 708 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 726 and proceed to filter and amplify (with a low-noise amplifier) the signal. The signal may be provided to a receiver of the transceiver that down-converts the RF signal into a baseband signal that is provided to the baseband processor of the processors 704.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 726.

In various embodiments, the RF interface circuitry 708 may be configured to transmit/receive signals in a manner compatible with NR access technologies.

The antenna 726 may include antenna elements to convert electrical signals into radio waves to travel through the air and to convert received radio waves into electrical signals. The antenna elements may be arranged into one or more antenna panels. The antenna 726 may have antenna panels that are omnidirectional, directional, or a combination thereof to enable beamforming and multiple input, multiple output communications. The antenna 726 may include microstrip antennas, printed antennas fabricated on the surface of one or more printed circuit boards, patch antennas, phased array antennas, etc. The antenna 726 may have one or more panels designed for specific frequency bands including bands in FR1 or FR2.

The user interface 716 includes various input/output (I/O) devices designed to enable user interaction with the UE 700. The user interface 716 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1100.

The sensors 720 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 722 may include software and hardware elements that operate to control particular devices that are embedded in the UE 700, attached to the UE 1100, or otherwise communicatively coupled with the UE 700. The driver circuitry 722 may include individual drivers allowing other components to interact with or control various input/output (I/O) devices that may be present within, or connected to, the UE 700. For example, driver circuitry 722 may include a display driver to control and allow access to a display device, a touchscreen driver to control and allow access to a touchscreen interface, sensor drivers to obtain sensor readings of sensor circuitry 720 and control and allow access to sensor circuitry 720, drivers to obtain actuator positions of electro-mechanic components or control and allow access to the electro-mechanic components, a camera driver to control and allow access to an embedded image capture device, audio drivers to control and allow access to one or more audio devices.

The PMIC 724 may manage power provided to various components of the UE 700. In particular, with respect to the processors 704, the PMIC 724 may control power-source selection, voltage scaling, battery charging, or DC-to-DC conversion.

In some embodiments, the PMIC 724 may control, or otherwise be part of, various power saving mechanisms of the UE 700 including DRX as discussed herein.

A battery 728 may power the UE 700, although in some examples the UE 700 may be mounted deployed in a fixed location, and may have a power supply coupled to an electrical grid. The battery 728 may be a lithium ion battery, a metal-air battery, such as a zinc-air battery, an aluminum-air battery, a lithium-air battery, and the like. In some implementations, such as in vehicle-based applications, the battery 728 may be a typical lead-acid automotive battery.

Figure 8:
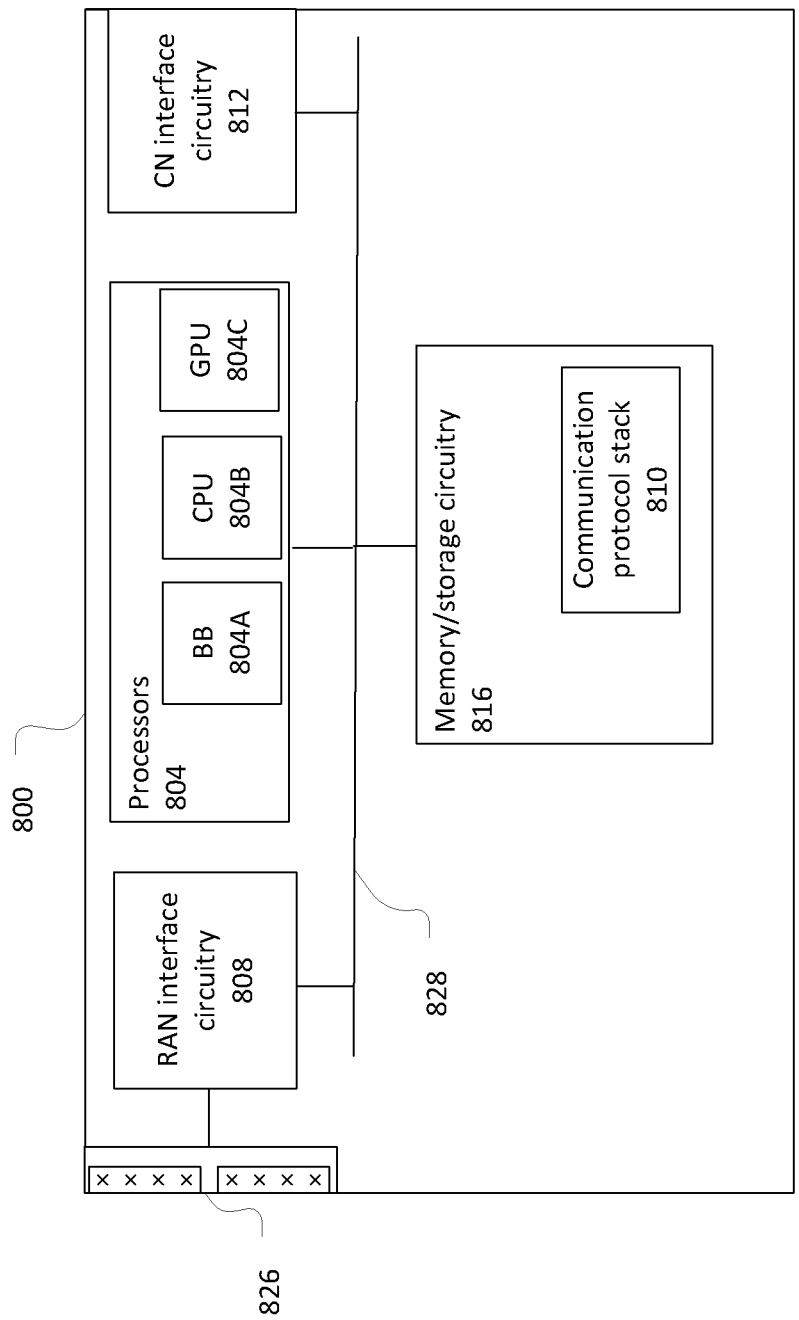
FIG. 8 illustrates a base station in accordance with some embodiments.

FIG. 8 illustrates a gNB 800 in accordance with some embodiments. The gNB node 800 may similar to and substantially interchangeable with base station 108 of FIG. 1.

The gNB 800 may include processors 804, RF interface circuitry 808, core network "CN" interface circuitry 812, memory/storage circuitry 816, and antenna structure 826.

The components of the gNB 800 may be coupled with various other components over one or more interconnects 828.

The processors 804, RF interface circuitry 808, memory/storage circuitry 816 (including communication protocol stack 810), antenna structure 826, and interconnects 828 may be similar to like-named elements shown and described with respect to FIG. 7.

The CN interface circuitry 812 may provide connectivity to a core network, for example, a $5^{th}$ Generation Core network "5GC" using a 5GC-compatible network interface protocol such as carrier Ethernet protocols, or some other suitable protocol. Network connectivity may be provided to/from the gNB 800 via a fiber optic or wireless backhaul. The CN interface circuitry 812 may include one or more dedicated processors or FPGAs to communicate using one or more of the aforementioned protocols. In some implementations, the CN interface circuitry 812 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method of operating a UE, the method comprising:
processing a configuration element to determine a relaxation factor; determining a relaxed evaluation period or measurement interval based on the relaxation factor; and performing a signaling characteristics evaluation (SCE) operation using the relaxed evaluation period or measurement interval.

Example 2 includes the method of example 1 or some other example herein, wherein the configuration element is a physical cell group configuration element or a downlink control information with cyclic redundancy check scrambled by power saving-radio network temporary identifier (DCP) configuration element.

Example 3 includes method of example 2 or some other example herein, further comprising: receiving the configuration element in a system information block (SIB) signal or a radio resource control (RRC) signal.

Example 4 includes the method of example 1 or some other example herein, wherein the SCE operation is a radio link monitoring (RLM) operation or a beam failure detection (BFD) operation and the method further comprises: processing the configuration element to determine low-mobility criterion; determining, based on one or more measurements at the UE and the low-mobility criterion, that the UE is in a low-mobility state; and performing the RLM or BFD operation using the relaxed evaluation period or measurement interval based on determination that the UE is in the low-mobility state.

Example 5 includes a method of example 4 some other example herein, further comprising: processing the configuration element to determine cell-edge criterion; determining, based on one or more measurements at the UE and the cell-edge criterion, that the UE is not located in an edge region of a serving cell; and performing the RLM or BFD operation using the relaxed evaluation period or measurement interval based on determination that the UE is in not located in the edge region of the serving cell.

Example 6 includes a method of example 1 or some other example herein wherein the SCE operation is a radio link monitoring (RLM) operation and the method further comprises: determining a relaxed Layer 1 (L1) measurement interval based on the relaxation factor (Q), wherein the relaxed L1 measurement interval is equal to: max(10 milliseconds (ms), $1.5 \times Q \times DRX_{cycle\_length}$, $1.5 \times Q \times T_{RLM-RS, M}$), where $DRX_{cycle\_length}$ is a length of a DRX cycle and $T_{RLM-RS,M}$ is a shortest periodicity of all configured radio link monitoring-reference signals (RLM-RSs), if $DRX_{cycle\_length}$ is less than or equal to 320 ms; or $DRX_{cycle\_length}$ if $DRX_{cycle\_length}$ is greater than 320 ms.

Example 7 includes the method of example 1 or some other example herein, wherein the SCE operation is a radio link monitoring (RLM) operation and the method further comprises: determining a relaxed Layer 1 (L1) measurement interval based on the relaxation factor (Q), wherein the relaxed L1 measurement interval is equal to $Q \times max(10$ milliseconds, $T_{RLM-RS, M})$ when discontinuous reception is not used, where $T_{RLM-RS, M}$ is a shortest periodicity of all configured radio link monitoring-reference signals (RLM-RSs).

Example 8 includes a method of example 1 or some other example herein, wherein the SCE operation is a radio link monitoring (RLM) operation and the method further comprises: determining a relaxed out-of-sync (OOS) evaluation period based on the relaxation factor (Q), wherein: when a discontinuous reception (DRX) cycle length ($T_{DRX}$) is less than or equal to 320 milliseconds, the relaxed OOS evaluation period is equal to max(200, Ceil($1.5 \times Q \times M_{out} \times P$)×max($T_{DRX}$, $T_{CSI-RS}$)) where $M_{out}$ is 20, P is a sharing factor, and $T_{CSI-RS}$ is a periodicity of a channel state information-reference signal (CSI-RS) resource for radio link monitoring (RLM); or, when DRX is not used, the relaxed OOS evaluation period is equal to max(200, Ceil($M_{out} \times P \times Q) \times T_{CSI-RS}$).

Example 9 includes the method of example 1 or some other example herein, wherein the SCE operation is a radio link monitoring (RLM) operation and the method further comprises: determining a relaxed in-sync (IS) evaluation period based on the relaxation factor (Q), wherein: when a discontinuous reception (DRX) cycle length ($T_{DRX}$) is less than or equal to 320 milliseconds (ms), the relaxed IS evaluation period is equal to max(100, Ceil($1.5 \times Q \times M_{in} \times P$)×Max($T_{DRX}$, $T_{CSI-RS}$)), where $M_{in}$ is 10, P is a sharing factor, and $T_{CSI-RS}$ is a periodicity of a channel state information-reference signal (CSI-RS) resource for the RLM operation; or, when DRX is not used, the relaxed IS evaluation period is equal to max(100, Ceil($M_{in} \times P \times Q) \times T_{CSI-RS}$).

Example 10 includes the method of example 1 or some other example herein, wherein the SCE operation is a radio link monitoring (RLM) operation and the method further comprises: determining a relaxed out-of-sync (OOS) evaluation period based on the relaxation factor (Q), wherein: when a discontinuous reception (DRX) cycle length ($T_{DRX}$) is less than or equal to 320 milliseconds (ms), the relaxed OOS evaluation period is equal to max(200, Ceil($15 \times P \times Q$)× max($T_{DRX}$, $T_{SSB}$)) where P is a sharing factor, and $T_{SSB}$ is a periodicity of a synchronous signal block (SSB) resource for the RLM operation; or, when DRX is not used, the relaxed OOS evaluation period is equal to max(200, Ceil($10 \times P \times Q$)× $T_{SSB}$).

Example 11 includes the method of example 1 or some other example herein, wherein the SCE operation is a radio link monitoring (RLM) operation and the method further comprises: determining a relaxed in-sync (IS) evaluation period based on the relaxation factor (Q), wherein: when a discontinuous reception (DRX) cycle length ($T_{DRX}$) is less than or equal to 320 milliseconds (ms), the relaxed IS evaluation period is equal to max(100, Ceil($7.5 \times P \times Q$)×Max ($T_{DRX}$, $T_{SSB}$)), where P is a sharing factor, and $T_{SSB}$ is a periodicity of a synchronous signal block (SSB) for the RLM operation; or, when DRX is not used, the relaxed IS evaluation period is equal to max(100, Ceil($5 \times P \times Q) \times T_{SSB}$).

Example 12 includes the method of operating a UE, the method comprising: storing a least common multiple (LCM) of a discontinuous reception (DRX) cycle and a periodicity of a radio link monitoring-reference signal (RLM-RS); determining an evaluation period based on the LCM; and performing an RLM operation using the evaluation period.

Example 13 includes the method of example 12 or some other example herein, wherein the DRX cycle is $T_{DRX}$, the RLM-RS is a channel state information-reference signal (CSI-RS), the periodicity of the CSI-RS is $T_{CSI-RS}$, the LCM of the DRX and the periodicity is (LCM($T_{DRX}$, $T_{CSI-RS}$)), the evaluation period is an out-of-sync (OOS) evaluation period and, when $T_{DRX}$ is less than or equal to 320 milliseconds (ms), the OOS evaluation period is equal to max(200, Ceil($M_{out} \times P$)×LCM($T_{DRX}$, $T_{CSI-RS}$)), where $M_{out}$ is 20 and P is a sharing factor.

Example 14 includes the method of example 12 or some other example herein, wherein the DRX cycle is $T_{DRX}$, the RLM-RS is a channel state information-reference signal (CSI-RS), the periodicity of the CSI-RS is $T_{CSI-RS}$, the LCM of the DRX and the periodicity is (LCM($T_{DRX}$, $T_{CSI-RS}$)), the evaluation period is an in-sync (IS) evaluation period and, when $T_{DRX}$ is less than or equal to 320 milliseconds (ms), the IS evaluation period is equal to max(100, Ceil($M_{in} \times P$)× LCM($T_{DRX}$, $T_{CSI-RS}$)), where $M_{in}$ is 10 and P is a sharing factor.

Example 15 includes the method of example 12 or some other example herein, wherein the DRX cycle is $T_{DRX}$, the RLM-RS is a synchronization signal block (SSB), the periodicity of the SSB is $T_{SSB}$, the LCM of the DRX and the periodicity is (LCM($T_{DRX}$, $T_{SSB}$)), the evaluation period is an out-of-sync (OOS) evaluation period and, when $T_{DRX}$ is less than or equal to 320 milliseconds (ms), the OOS evaluation period is equal to max(200, Ceil($15 \times P$)×LCM ($T_{DRX}$, $T_{SSB}$)), where P is a sharing factor.

Example 16 includes the method of example 12 or some other example herein, wherein the DRX cycle is $T_{DRX}$, the RLM-RS is a synchronization signal block (SSB), the periodicity of the SSB is $T_{SSB}$, the LCM of the DRX and the periodicity is (LCM($T_{DRX}$, $T_{SSB}$)), the evaluation period is an in-sync (IS) evaluation period and, when $T_{DRX}$ is less than or equal to 320 milliseconds (ms), the IS evaluation period is equal to max(100, Ceil($7.5 \times P$)×LCM($T_{DRX}$, $T_{SSB}$)), where P is a sharing factor.

Example 17 includes a method of operating a UE, the method comprising: processing one or more configuration elements to determine a relaxation factor or least common multiplier (LCM); determining a measurement period for intra-frequency measurements without measurement gaps based on the relaxation factor or the LCM; and performing a neighbor cell measurement using the measurement period.

Example 18 includes the method of example 17 or some other example herein, further comprising: processing the one or more configuration elements to determine the relaxation factor (Q); and, when discontinuous reception is not used, the measurement period is equal to a max(200 milliseconds (ms), ceil(5×Q×$K_p$)×SMTC period)×$CSSF_{intra}$, where $K_p$ is 1 or (1/(1−(SMTC period/measurement gap repetition period (MGRP)))), SMTC period is a period of a synchronization signal block-based measurement timing configuration, and $CSSF_{intra}$ is an intra-frequency carrier-specific scaling factor.

Example 19 includes the method of example 17 or some other example herein, further comprising processing the configuration element to determine the relaxation factor (Q); and, when a discontinuous reception (DRX) cycle is less than or equal to 320 milliseconds (ms), the measurement period is equal to a max(200 ms, ceil(1.5×5×Q×$K_p$)×max (SMTC period, DRX cycle))×$CSSF_{intra}$, where $K_p$ is 1 or (1/(1−(SMTC period/measurement gap repetition period (MGRP)))), SMTC period is a period of a synchronization signal block-based measurement timing configuration, and $CSSF_{intra}$ is an intra-frequency carrier-specific scaling factor.

Example 20 includes the method of example 17 or some other example herein, further comprising: processing the configuration element to determine the LCM; and, when a discontinuous reception (DRX) cycle is less than or equal to 320 milliseconds (ms), the measurement period is equal to max(200 milliseconds (ms), ceil(5×$K_p$)×LCM(SMTC period, DRX cycle)×$CSSF_{intra}$, where $K_p$ is 1 or (1/(1−(SMTC period/measurement gap repetition period (MGRP)))), SMTC period is a period of a synchronization signal block-based measurement timing configuration, and $CSSF_{intra}$ is an intra-frequency carrier-specific scaling factor.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a datagram, information element, packet, frame, segment, PDU, or message as described in or related to any of examples 1-20, or portions or parts thereof, or otherwise described in the present disclosure.

Example 28 may include a signal encoded with data as described in or related to any of examples 1-20, or portions or parts thereof, or otherwise described in the present disclosure.

Example 29 may include a signal encoded with a datagram, IE, packet, frame, segment, PDU, or message as described in or related to any of examples 1-20, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or portions thereof.

Example 31 may include a computer program comprising instructions, wherein execution of the program by a processing element is to cause the processing element to carry out the method, techniques, or process as described in or related to any of examples 1-20, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory, computer-readable media having instructions that, when executed, cause processing circuitry to:
   process a configuration element to determine a relaxation factor;
   determine a relaxed out-of-sync (OOS) evaluation period based on the relaxation factor, wherein the relaxed OOS evaluation period is equal to max(200, Ceil(15× P×Q)×max($T_{DRX}$, $T_{SSB}$)) where Q is the relaxation factor, P is a sharing factor, $T_{DRX}$ is a discontinuous reception cycle length, and $T_{SSB}$ is a periodicity of a synchronous signal block (SSB) resource; and
   perform a radio link monitoring (RLM) operation using the relaxed OOS evaluation period.

2. The one or more non-transitory, computer-readable media of claim 1, wherein the configuration element is a physical cell group configuration element or a downlink control information with cyclic redundancy check scrambled by power saving-radio network temporary identifier (DCP) configuration element.

3. The one or more non-transitory, computer-readable media of claim 1, wherein the instructions, when executed, further cause the processing circuitry to:
receive the configuration element in a system information block (SIB) signal or a radio resource control (RRC) signal.

4. The one or more non-transitory, computer-readable media of claim 1, wherein the instructions, when executed, further cause the processing circuitry to:
process the configuration element to determine low-mobility criterion;
determine, based on one or more measurements at the processing circuitry and the low-mobility criterion, that a user equipment (UE) is in a low-mobility state; and
perform the RLM operation using the relaxed OOS evaluation period based on determination that the UE is in the low-mobility state.

5. The one or more non-transitory, computer-readable media of claim 4, wherein the instructions, when executed, further cause the processing circuitry to:
process the configuration element to determine cell-edge criterion;
determine, based on one or more measurements at the processing circuitry and the cell-edge criterion, that a user equipment (UE) is not located in an edge region of a serving cell; and
perform the RLM operation using the relaxed OOS evaluation period based on determination that the UE is in not located in the edge region of the serving cell.

6. The one or more non-transitory, computer-readable media of claim 1, wherein the instructions, when executed, further cause the processing circuitry to:
determine a relaxed in-sync (IS) evaluation period based on the relaxation factor (Q), wherein: when $T_{DRX}$ is less than or equal to 320 milliseconds (ms), the relaxed IS evaluation period is equal to max(100, Ceil(7.5×P×Q)× Max($T_{DRX}$, $T_{SSB}$)); or, when DRX is not used, the relaxed IS evaluation period is equal to max(100, Ceil(5×P×Q)×$T_{SSB}$).

7. The one or more non-transitory, computer-readable media of claim 1, wherein the relaxation factor is two.

8. The one or more non-transitory, computer-readable media of claim 1, wherein the relaxation factor is four.

9. A baseband processor comprising:
processing circuitry to:
process a configuration element to determine a relaxation factor;
determine a relaxed out-of-sync (OOS) evaluation period based on the relaxation factor, wherein the relaxed OOS evaluation period is equal to max(200, Ceil(15×P×Q)×max($T_{DRX}$, $T_{SSB}$)) where Q is the relaxation factor, P is a sharing factor, $T_{DRX}$ is a discontinuous reception cycle length, and $T_{SSB}$ is a periodicity of a synchronous signal block (SSB) resource; and
perform a radio link monitoring (RLM) operation using the relaxed OOS evaluation period; and
interface circuitry, coupled with the processing circuitry, the interface circuitry to communicatively couple the processing circuitry to a component.

10. The baseband processor of claim 9, wherein the configuration element is a physical cell group configuration element or a downlink control information with cyclic redundancy check scrambled by power saving-radio network temporary identifier (DCP) configuration element.

11. The baseband processor of claim 9, wherein the processing circuitry is further to:
receive the configuration element in a system information block (SIB) signal or a radio resource control (RRC) signal.

12. The baseband processor of claim 9, wherein the processing circuitry is further to:
process the configuration element to determine low-mobility criterion;
determine, based on one or more measurements at the processing circuitry and the low-mobility criterion, that a user equipment (UE) is in a low-mobility state; and
perform the RLM operation using the relaxed OOS evaluation period based on determination that the UE is in the low-mobility state.

13. The baseband processor of claim 12, wherein the processing circuitry is further to:
process the configuration element to determine cell-edge criterion;
determine, based on one or more measurements at the processing circuitry and the cell-edge criterion, that a user equipment (UE) is not located in an edge region of a serving cell; and
perform the RLM operation using the relaxed OOS evaluation period based on determination that the UE is in not located in the edge region of the serving cell.

14. The baseband processor of claim 9, wherein the processing circuitry is further to:
determine a relaxed in-sync (IS) evaluation period based on the relaxation factor (Q), wherein: when $T_{DRX}$ is less than or equal to 320 milliseconds (ms), the relaxed IS evaluation period is equal to max(100, Ceil(7.5×P×Q)× Max($T_{DRX}$, $T_{SSB}$)); or, when DRX is not used, the relaxed IS evaluation period is equal to max(100, Ceil(5×P×Q)×$T_{SSB}$).

15. The baseband processor of claim 9, wherein relaxation factor is two.

16. The baseband processor of claim 9, wherein the relaxation factor is four.

17. A method comprising:
processing a configuration element to determine a relaxation factor;
determining a relaxed out-of-sync (OOS) evaluation period based on the relaxation factor, wherein the relaxed OOS evaluation period is equal to max(200, Ceil(15×P×Q)×max($T_{DRX}$, $T_{SSB}$)) where Q is the relaxation factor, P is a sharing factor, $T_{DRX}$ is a discontinuous reception cycle length, and $T_{SSB}$ is a periodicity of a synchronous signal block (SSB) resource; and
performing a radio link monitoring (RLM) operation using the relaxed OOS evaluation period.

18. The method of claim 17, further comprising:
determining the configuration element based on a system information block (SIB) signal or a radio resource control (RRC) signal.

19. The method claim 17, wherein the relaxation factor is two.

20. The method of claim 17, wherein the relaxation factor is four.

* * * * *